United States Patent [19]
Taylor et al.

[11] Patent Number: 5,743,013
[45] Date of Patent: Apr. 28, 1998

[54] ZIRCONIA-BASED TIPPED BLADES HAVING MACROCRACKED STRUCTURE AND PROCESS FOR PRODUCING IT

[75] Inventors: Thomas Alan Taylor; Don Joseph Lemen, both of Indianapolis, Ind.

[73] Assignee: Praxair S.T. Technology, Inc., Danbury, Conn.

[21] Appl. No.: 596,797

[22] Filed: Feb. 5, 1996

Related U.S. Application Data

[62] Division of Ser. No. 307,204, Sep. 16, 1994, Pat. No. 5,520,516.

[51] Int. Cl.$^6$ .................................................. B23P 15/00
[52] U.S. Cl. ............................... 29/889.7; 29/889.1
[58] Field of Search ............................ 29/889, 889.1, 29/889.7; 427/205; 416/241 B; 428/419, 472, 325

[56] References Cited

U.S. PATENT DOCUMENTS

| | | | |
|---|---|---|---|
| 4,377,371 | 3/1983 | Wisander et al. | 415/174 |
| 4,430,360 | 2/1984 | Stecura | 428/633 |
| 4,457,948 | 7/1984 | Ruckle et al. | 427/34 |
| 4,481,237 | 11/1984 | Bosshart et al. | 427/326 |
| 4,503,130 | 3/1985 | Bosshart et al. | 428/632 |
| 4,588,607 | 5/1986 | Matarese et al. | 427/34 |
| 5,059,095 | 10/1991 | Kushner et al. | 416/241 |
| 5,073,433 | 12/1991 | Taylor | 428/134 |

OTHER PUBLICATIONS

"Experience with MCrAl and Thermal Barrier Coatings Produced Via Inert Gas Shrouded Plasma Deposition" T.A. Taylor et al J. Vac. Sci. Technol. A3 (6), Nov./Dec. 1985, pp. 2526–2531.

"Thermal Fatigue of Plasma Sprayed MgO.ZrO$_2$ and ZrO$_2$–6.6Y$_2$O$_2$ Thermal Barrier Coatings". Taylor et al. 84th Annual Meeting American Ceramic Soc. Cincinnati, Ohio, May 4, 1982.

"AIAA-80-1193 Development of Improved–Durability Plasma Sprayed Ceramic Coatings for Gas Turbine Engines", I.E. Sumner et al.
AIAA/SAE/ASME 16th Joint Propulsion Conference, Jun. 30–July 2, 1980, Hartford, Connecticut pp. 1–13.

"Experimental and Theoretical Aspects of Thick Thermal Barrier Coatings for Turbine Applications", Thermal Spray: Advances in Coatings Technology, National Thermal Spray Conference 14–17 Sep. 1987. Orlando, Florida, USA, pp. 155–156; G. Johner et al.

*Primary Examiner*—Irene Cuda
*Attorney, Agent, or Firm*—Robert J. Feltovic

[57] ABSTRACT

A compressor or turbine blade having its tip coated with a zirconium-based oxide having a plurality of macrocracks extending at least 100 microns through the coating and the process used to produce such a coating.

10 Claims, No Drawings

ZIRCONIA-BASED TIPPED BLADES HAVING MACROCRACKED STRUCTURE AND PROCESS FOR PRODUCING IT

This application is a Division of prior U.S. application: Ser. No. 08/307,204, Filing Date Sep. 16, 1994, now U.S. Pat. No. 5,520,516.

FIELD OF THE INVENTION

The invention relates to blades, such as turbine and compressor blades for gas turbines, in which the tips of the blades are coated with a zirconium-based oxide coating having a plurality of macrocracks extending at least 4 mils through the coating and having between 5 to 90 vertical macrocracks per linear centimeter measured in a line parallel to the surface of the blade tip and in a plane perpendicular to the surface of the tip of the blade.

BACKGROUND OF THE INVENTION

Modern gas turbine engines are comprised of three major sections or components which function together to produce thrust for aircraft propulsion. In the compressor section, incoming ambient air is compressed and thus heated by a number of stages of rotating blades and stationary vanes. In the initial stages of the compressor the blades are generally made of titanium alloys, and in the later stages where temperatures are higher, the blades are generally made of iron or nickel base alloys. The compressed air may be heated to 1200° to 1400° F. at the last stage of compression, where it is passed on to the combustor where fuel is injected and burned. The hot gases exiting the combustor may be about 2400° F., and are directed upon the first stage vane and blade of the turbine section. In the turbine section, comprised of a number of stages of rotating blades and stationary vanes, the actual work is extracted from the hot, compressed gases that turn the turbine which is connected to drive the earlier compressor section. A significant portion of the engine thrust comes from the large fan section at the front of the engine, which takes in ambient air and thrusts it backwards at a high velocity. The fan is also driven by the turbine section.

In the compressor, the early stages or the low compressor section are comprised of titanium alloy blades that rotate at high speed. The blades are designed such that their tips are very close to a stationary seal ring. The purpose of the close gap is to minimize gas leakage and to allow the pressure of the air to increase from one stage to the next. Narrow tip to seal gaps lead to higher engine efficiency and greater power output. If the gap is too narrow, there is the possibility of a rub between the tip and the seal. This can occur, for example, when the engine is started or if the pilot advances the throttle for more power. In these cases the blade can heat up faster than the surrounding case and through thermal expansion become longer and thus rub the seal ring. There are likely other mechanisms that also cause rubs. When the titanium alloy blade rubs the seal, the friction can be very high and the blade tip can heat up quickly to temperatures where the hot titanium can actually burn or oxidize with a further great liberation of heat. These situations are essentially titanium fires, and if left unchecked could damage the engine. Accordingly, a coating on the tip of these titanium blades is applied to separate the bare titanium from the seal material if a rub should occur.

In the turbine, the early stages of the high pressure turbine section are generally comprised of nickel base superalloy blades that rotate at high speed. These blades are also designed such that their tips are very close to a stationary seal ring. The purpose of the close gap is to minimize gas leakage and to allow the pressure of the air to do work against the turbine blades, causing them to rotate. Narrow tip to seal gaps lead to higher engine efficiency and greater power output. If the gap is too narrow, there is the possibility of a rub between the tip and the seal. As stated above, this can occur, for example, when the engine is started or if the pilot advances the throttle for more power. In these cases the blade can heat up faster than the surrounding case and through thermal expansion become longer and thus rub the seal ring. There are likely other mechanisms that also cause rubs. Typically, when a bare superalloy blade tip rubs against a bare cast superalloy seal, then the blade tip is worn back. In an improved design, the seal is coated with a material that is more rub tolerant than the cast seal material, and the seal takes a more significant fraction of the wear and the blade tip is less worn. However, that situation is still not ideal and coatings for blade tip are desired that reduce tip wear even more.

As engine temperatures are increased in a search for higher efficiency of operation, the metallic seal coatings suffer oxidation and some manufacturers are looking to ceramic seal coatings. In that case, the demands on a wear resistance blade tip coating increase even more. In a further progression of tip treatments, a composite layer of cubic boron nitride (CBN) embedded in a nickel or nickel alloy matrix is paced on the tip. This allows the tip coating to cut or grind into the seal material in a rub situation. However, this composite coating is difficult and expensive to apply to blade tips such as titanium blade tips.

U.S. Pat. No. 5,059,095 discloses a turbine rotor blade tip coated with alumina-zirconia ceramic. Specifically, the ceramic layer consisting of a combination of aluminum oxide and zirconium oxide or at least partially stabilized zirconium oxide. U.S. Pat. No. 5,073,433 discloses a thermal barrier coating comprising zirconia partially stabilized by yttria and having a substantially homogeneous dispersion of vertical macrocracks throughout the coating to improve its thermal fatigue.

It is an object of the present invention to provide a blade for a gas turbine engine whose tip segment is coated with a layer of a zirconium-based oxide having a plurality of vertical cracks and which has good rub tolerance when contacting a seal material such as a bare cast superalloy.

It is another object of the present invention to provide a stabilized zirconia coating for the tip portion of blades for a turbine engine having a plurality of macrocracks in the surface of the coating.

It is another object of the present invention to provide a turbine or compressor blade on which the tip of the blade has a zirconium based oxide coating with embedded particles more abrasive than zirconia and having a plurality of macrocracks throughout the coating.

It is another object of the present invention to provide a process for producing a coating for the tip of turbine and compressor blades having good rub tolerance characteristics.

SUMMARY OF THE INVENTION

The invention relates to blades for a gas turbine engine having an inner end adapted for mounting on a hub, such as a rotatable hub, and a blade tip located opposite the inner end, and wherein at least the tip of the blade is coated with a layer of a zirconium-based oxide having a plurality of macrocracks substantially vertical to the plane of the coated layer and extending from 4 mils, preferably 8 mils, up to the thickness of the coated layer and having from 5 to 100 vertical cracks, preferably 8 to 50 vertical macrocracks, and most preferably 16 to 32 vertical macrocracks, per linear centimeter measured in a line parallel to and in a plane perpendicular to the surface of the blade tip. The length of at least 50%, preferably 70%, of the vertical cracks should extend at least 4 mils so that they pass through at least 50 splats of the deposited powder. Preferably, the coating should extend over the tip and onto at least a portion of the airfoil. The airfoil area of the blade is the area that is contacted by a fluid normal to the area, such as a gas, during the operational mode of the engine.

Preferably the density of the coating should be at least about 88% of the theoretical density or have a porosity of less than about 12 vol. percent, more preferably a porosity of less than about 10 vol percent. The starting zirconia powder should preferably be sized 120 Tyler mesh or finer. When including a second component more abrasive than the zirconia then preferably the second component should be sized at least 2 mils in any dimension up to 95% of the coating thickness. In this embodiment in which at least two powders are used, it is preferable to have the fine zirconia particles adhere to the surface of the larger abrasive particles. Suitable abrasive particles would be alumina, chromia, or alloys thereof added to the total powder composition in an amount of 10 to 40 weight percent of the total powder, preferably 20 to 30 weight percent of the total powder composition.

The zirconia could be partially stabilized by at least one stabilizing oxide selected from the group consisting of yttria, calcium oxide, cerium oxide, and magnesium oxide. The preferred stabilizer is yttria and it could be preferably present in an amount of 6.5 to 9 weight percent. The stabilizing oxides could be used to partially or fully stabilize the zirconia so as to minimize or prevent any phase transformation that could otherwise occur in pure zirconia at elevated temperatures.

The thickness of the coating could preferably be from 50 to 1000 microns, preferably 250 to 750 microns, depending on the blade to be coated and the environment that the blade will be used. Sample blades were obtained with a flat tip surface with very sharp edges. Some of the blades were coated just as received. One of the preliminary tests done was to simply test the coating adhesion to the blade with a localized, high stress probe test. The coating on the sharp edge blade tip was found to be subject to failure. A method was then developed that essentially increased the coating shear strength in such a probe test, and it is expected to prove equally beneficial in an actual engine rub interaction where high shear loading also occurs. The method was to radius the edge of the blade tip, to about one-quarter to about three-quarters, preferably about one-half of the total coating thickness amount. Preferably, the ratio should be at least 10 mils. For example, if a 20 mil coating thickness was desired, then a 10 mil edge radius would allow the coating to wrap around the tip to achieve the improved shear strength, but was not too much to noticeably change the geometry of the tip. We expect the same shear strength improvement would come if we machined a bevel around the edge of the tip, using the same one-quarter to three-quarters coating thickness guideline. In addition to the method of blade edge radius or bevel for improved bonding, it has been found that the blade tip should be toughened just prior to coating for the best bond strength. Preferably, a minimum roughness of 150 microinches Ra, more preferably a minimum of 200 microinches Ra, will improve the bond strength. The method for roughening can be abrasive grit blasting, such as with 60 or 46 mesh angular alumina in a pressurized air stream, or using a high pressure pure waterjet. The standard abrasive high pressure waterjet, which typically uses fine garnet abrasive particles in a waterjet operating at pressures of 50,000 psi, can be used to cut or machine metallic surfaces. It has been found that the garnet abrasive can be removed and the jet can operate with pure water to roughen the surface of metallic substrates prior to coating. Contrary to normal expectations, this pure high pressure waterjet will erode a metallic surface, producing a new surface that is ideally suited for subsequent coating, because it is roughened on a very fine scale and is totally free of surface contamination, such as abrasive grit inclusions from normal surface toughening procedures like grit blasting. The waterjet pressure and the nozzle traverse rate must be carefully controlled to avoid too deep erosion.

As used herein, a splat shall mean a single molten powder particle impacted upon the surface of the substrate wherein it spreads out to form a thick platelet. Generally these platelets are from 5 to 100 microns in diameter and 1 to 5 microns thick, more generally about 2 microns thick.

As used herein, a vertical macrocrack is a crack in the coating if extended to contact the surface of the substrate will form an angle of from 30° to 0° with a line extended from said contact point normal to the surface of the substrate. Preferably, the vertical macrocracks will form an angle of 10° to 0°. If present, any horizontal macrocracks should preferably not extend to contact more than one vertical macrocrack since to do so could weaken the coating and subject the coating to spalling. The length dimension of the vertical macrocrack and the length dimension of the horizontal macrocrack is the straight line distance from one end of the crack to the opposite end of the crack.

The porosity of the coating preferably should be between 2% and 10% and most preferably about 8%. The vertical macrocracks could be formed in the coating by plasma depositing powders of the coating onto the surface of the substrate in discrete monolayers in which the thickness of each monolayer contains at least two superimposed splats of the deposited powder (about 0.16 mils) and preferably from about three to five splats of the deposited powder (from about 0.24 mils to 0.40 mils, respectively). Although not bound by theory, it is believed that the deposit of two or more superimposed splats of the powder will result in the second and subsequent splats being deposited at higher temperatures than the preceding splats. This is due to the fact that the first splat of the powder is deposited on a relatively colder substrate while the second and subsequent splats are deposited on preceding splats that are progressively hotter. Thus the overall deposit of two or more splats results in a temperature gradient with the higher temperature at the top surface. Upon cooling and solidification of the monolayer deposit, the second and subsequent splats shrink more than the preceding spats and form vertical macrocracks through the deposited layer. Additional monolayers are superimposed on the substrate with each monolayer forming vertical macrocracks which have a tendency to align with the previously formed macrocracks in the preceding monolayers. This effectively produces some macrocracks that extend substantially through the thickness of the coating. The width of the vertical macrocracks, i.e., the distance between opposing faces defining the vertical macrocracks, is generally less than about 1 mil, preferably less than ½ mil. It has been found that if the porosity of the coating is greater than 10% by volume, the stress caused by the shrinkage of splats in the monolayer may be absorbed or compensated by such higher porosity of the coating. This will effectively prevent the formation of macrocracks throughout the coating as is required according to this invention. The substantial homogeneous distribution of vertical macrocracks throughout the coating as required by this invention will reduce the modulus of elasticity of the coating structure thereby reducing the local stresses.

The density of the vertical macrocracks should be preferably 10 or more, most preferably 20 or more, vertical macrocracks per linear centimeter taken in a cross-section plane of the coating along a line parallel to the surface of the substrate. This will insure that sufficient vertical macrocracks are present in the coating to provide good thermal and mechanical properties. To obtain the necessary vertical macrocracks in this coating, the plasma apparatus should be of high efficiency and stable over the period of depositing the coating. The spray torch should be positioned at a fixed distance from the substrate and the relative speed between the torch and the substrate should be controlled to insure that the monolayer instantly put down by one sweep of the torch will be sufficient to produce overlap of the deposited splats of powder in which the second and subsequent deposited splats are hotter than the preceding deposited splats for the reason discussed above. The overall thickness of the coating can vary depending on the end use application. The coating thickness of the blade tips can very from 50 to 1000 microns. The preferred powder composition is zirconia partially stabilized by yttria in an amount of from 6.5 to 9 weight percent yttria with the balance zirconia and most preferably about 7 weight to 8 percent yttria with the balance substantially zirconia. The coating of this invention is also ideally suited as a top coat for a metallic bond coated superalloy blade of a gas turbine engine. The preferred metallic bond coating would comprise an alloy containing at least one element selected from the group consisting of chromium, aluminum, and yttrium with at least one metal selected from the group consisting of nickel, cobalt and iron. This bond coating can be deposited using conventional plasma spray techniques or any other conventional technique. The substrate could be any suitable material such as titanium, titanium alloy, a nickel-base alloy, cobalt-base alloy or iron-base alloy.

The coating of this invention is also ideally suited as a top coat for a bond coated titanium alloy blade of a gas turbine engine. The preferred metallic bond coating would comprise titanium or titanium alloys, chosen to match the alloy of the blade. This coating can be deposited using shielded plasma spray techniques or HVOF techniques. The preferred non-metallic bond coating would comprise aluminum oxide or alloys of alumina and titania or chromia. This coating can be deposited using detonation gun, conventional plasma spray techniques or any other conventional technique. The substrate could be any suitable material such as titanium or a titanium alloy. The coating of this invention can also be deposited on titanium alloy substrates, in particular a titanium alloy compressor blade tip, without a bondcoat.

The invention also relates to a process for producing a coating on the tip of a blade comprising the steps:
  (a) thermally depositing zirconia-based powders onto at least the tip of a blade to form a monolayer having at least two superimposed splats of the deposited powders on at least the tip of the blade in which the temperature of a subsequent deposited splat is higher than the temperature of a previously deposited splat;
  (b) cooling and solidifying said monolayer wherein said monolayer has a porosity less than about 12 volume percent and wherein a plurality of vertical cracks are produced in the monolayer due to shrinkage of the deposited splats;
  (c) repeating steps (a) and (b) at least once to produce an overall coated layer in which each monolayer has induced vertical cracks through the splats and wherein at least 50% of the vertical cracks in each monolayer are aligned with vertical cracks in an adjacent monolayer to form vertical macrocracks having a length of at least 4 mils up to the thickness of the coating and said coated layer having at least 10 vertical macrocracks per linear centimeter measured in a line parallel to the surface of the blade.

Preferably, the spray deposition parameters should be such that the zirconia powders are at least partially melted, preferably completely melted, and then deposited at a rate such that at least two superimposed splats occur in an area while the blade makes any single pass under the thermal spray device. Preferably, the abrasive particles, if present, are not melted while the zirconia particles are at least partially melted. In some applications, some of the smaller size range of the abrasive particles may be melted during the deposition step without effecting the coating of this invention.

A further improvement was found in that a heat treatment of the deposited coating improves its erosion resistance, and this information could thereby be inferred that its wear resistance would also be improved. It was found that a vacuum heat treatment from 1 to 10 hours at about 1800° F. to 2200° F. would be effective and that a heating for about 4 hours at about 1975° F. would be suitable. It was found that a heat treatment in air was more effective than in vacuum for improving the zirconia. However, if there is a metallic bond coat in place under the zirconia, then an initial heat treatment in air may cause the bond coat to oxidize. If we first heat treat the blade, bond coat and topcoat in vacuum, the bond coat will be sintered to a higher density and will then be resistant to oxidation. Therefore, an alternate sequence is to do the vacuum heat treatment first by heating the blade from 1800° F. to 2200° F. for about 1 to 10 hours and then do the air heat treatment at about 600° F. to 1200° F. for a period of from 0.1 to 4 hours to further improve the properties of the zirconia-based layer. To show the improvement in erosion resistance due to the vacuum heat treatment, the weight loss of identically coated zirconia layers on one inch diameter buttons were measured after being exposed to the following particle erosion test.

An S. S. White abrasive blasting gun was used to propel 600 grams of 50 micron alumina at an angle of 20° against a one by two inch coupon having a plasma sprayed as-deposited coating and an identical coated coupon was heated 4 hours at 1975° F. in vacuum. It was found that the erosion rate of the heat treated coating was reduced 34 percent over the coating that was not heated.

The coating of this invention may be deposited on a blade tip without the need for a bond coat. This is particularly true of titanium blades and thus the time required and the cost of providing the sole coatings to the blade tip is substantially reduced. It was found the pre-heating of the blades before the spray powder is deposited produced an improved coating process. Specifically, the blade could be pre-heated to about 200° F. to about 600° F. before step (a) in this process.

Nickel alloy blades were coated with 7 weight percent yttria stabilized zirconia over a NiCoCrAlY bond coat. The coated samples were vacuum heat treated 4 hours at 1975° F. The coated blades were tested using a test rig having the following test parameters:
  Tip speed: 500 ft per second
  Rub depth target: 1 mil per second up to a 20 mil depth
  It was found that the best way to rank the performance of tip coatings in this test was to measure the volume of material removed from the tip and the seal materials, and calculate what is called the volume wear ratio (VWR). VWR is the ratio of the volume wear of the tip to the volume wear of the seal, a dimensionless ratio. An ideal VWR would be of the order of 0.05 or less. The following table gives the rub test results for the coating of this invention.

TABLE

| VOLUME WEAR RATIO, TIP COATING TO SEAL NICKEL ALLOY BLADE | | | | |
|---|---|---|---|---|
| Test number | A | B | C | D |
| Seal Material | 1* | 1* | 2** | 2** |
| Rub Temperature, °F. | | | | |
| Blade tip | 1480 | 2250 | 2350 | 2650 |
| Seal surface | 1790 | 2450 | 2180 | 2550 |
| VWR | .000 | .064 | .058 | 0.163 |

*Proprietary to engine manufacturer, some sort of a smooth and hard material.
**Proprietary to engine manufacturer, some sort of ceramic coating.

According to this test, the coating of the subject invention had extraordinary good VWR results and thus are ideally suited for coatings for the tip of blades for turbine engines.

Though the invention has been described with respect to specific embodiments thereof, many variations and modifications will become apparent to those skilled in the art. It is therefore the intention that the appended claims be interpreted as broadly as possible in view of the prior art to include all such variations and modifications.

What is claimed:

1. A process for producing a coating on at least the tip of a blade comprising the steps:
   (a) radiusing the tip edge of a blade to a degree that the radius of the tip of the blade should be about ¼ to ¾ of the thickness of a coating deposited in accordance with steps (b) through (d) as described below;
   (b) thermally depositing zirconia-based powders onto at least the tip of a blade at a rate to form a monolayer having at least two superimposed splats of the deposited powders on at least the tip of the blade in which the temperature of a subsequent deposited splat is higher than the temperature of a previously deposited splat;
   (c) cooling and solidifying said monolayer wherein said monolayer has a porosity less than about 12 vol. percent and wherein a plurality of vertical cracks are produced in the monolayer due to shrinkage of the deposited splats; and
   (d) repeating steps (a) and (b) at least once to produce an overall coated layer in which each monolayer has induced vertical cracks through the splats and wherein at least 70% of the vertical cracks in each monolayer are aligned with vertical cracks in an adjacent monolayer to form vertical macrocracks having a length of at least 4 mils up to the thickness of the coating and said coated layer having at least 5 vertical macrocracks per linear centimeter measured in a line parallel to the surface of the blade and in a plane perpendicular to the surface of the blade tip.

2. The process of claim 1 wherein in step (b) said powder comprises 6.5 to 9 weight percent yttria balance substantially zirconia.

3. The process of claim 1 wherein in step (b) the monolayer comprises at least 3 superimposed splats.

4. The process of claim 1 wherein prior to step (b) the blade is heated to a temperature of about 200° F. to about 600° F.

5. The process of claim 1 wherein after step (d) the coated blade is heated in vacuum between about 1800° F. to about 2200° F. for a time period of from 1 to 10 hours.

6. The process of claim 5 wherein after heating in vacuum the coated blade is heated in air between about 600° F. to 1200° F. for a time period of from 0.1 to 4 hours.

7. The process of claim 1 wherein the coating in step (d) has from 16 to 32 vertical macrocracks per linear centimeter measured in a line parallel to the surface of the blade tip and in a plane perpendicular to the surface of the blade tip.

8. The process of claim 1 wherein the blade tip in step (b) comprises a bond coated superalloy blade tip or a bond coated titanium alloy blade tip wherein the bond coating for the superalloy blade tip comprises an alloy containing at least one element selected from the group consisting of chromium, aluminum, hafnium and yttrium with at least one metal selected from the group consisting of nickel, cobalt, and iron; and the bond coating for the titanium alloy blade tip comprising titanium or a titanium alloy.

9. The process of claim 1 wherein before step (b) the blade is roughened with a pure water high pressure waterjet.

10. The process of claim 1 wherein in step (b) abrasive particles selected from the group consisting of alumina, chromia and alloys thereof are added to the zirconia-based powders.

* * * * *